United States Patent
Jain

(10) Patent No.: US 12,279,310 B2
(45) Date of Patent: Apr. 15, 2025

(54) UTILIZING COLOR SWITCH ANNOUNCEMENT FRAMES TO REDUCE FRAME COLLISIONS AND RETRIES FOR OVERLAPPING UPLINK NETWORK TRAFFIC

(71) Applicant: Fortinet, Inc., Sunnyvale, CA (US)

(72) Inventor: Ankur Jain, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 386 days.

(21) Appl. No.: 17/958,044

(22) Filed: Sep. 30, 2022

(65) Prior Publication Data

US 2024/0114550 A1   Apr. 4, 2024

(51) Int. Cl.
*H04W 24/08* (2009.01)
*H04W 74/08* (2009.01)
*H04W 74/0816* (2024.01)

(52) U.S. Cl.
CPC ....... *H04W 74/0816* (2013.01); *H04W 24/08* (2013.01); *H04W 74/0866* (2013.01)

(58) Field of Classification Search
CPC ... H04L 1/1819; H04L 1/1896; H04L 1/1825; H04L 1/1887; H04L 1/1851; H04L 1/1883; H04L 1/1812; H04L 1/1854; H04L 2001/0097; H04W 24/08; H04W 76/28; H04W 52/0216
See application file for complete search history.

(56) References Cited

U.S. PATENT DOCUMENTS

| | | | |
|---|---|---|---|
| 11,350,458 B1 * | 5/2022 | Narula | H04W 74/0808 |
| 2018/0110046 A1 * | 4/2018 | Patil | H04W 72/0446 |
| 2019/0246423 A1 * | 8/2019 | Alpert | H04L 5/0055 |
| 2020/0288323 A1 * | 9/2020 | Silverman | H04W 74/0825 |

* cited by examiner

*Primary Examiner* — Meng Vang
*Assistant Examiner* — Hector Reyes
(74) *Attorney, Agent, or Firm* — Law Office of Dorian Cartwright; Dorian Cartwright

(57) ABSTRACT

Responsive to receiving uplink traffic from a specific edge client on the edge client table, in-service monitoring for frame retries and collisions associated with the specific edge client is performed. Responsive to detecting that a rate of frame retries and collisions exceed a threshold, a BSS color change announcement frame is transmitted to the specific edge client comprising a second color. The BSS color change announcement directs the specific edge client to contend for medium access based on preambles observed from a specific overlapping BSS associated with the second BSS color rather than its home BSS. The default color can be restored after the uplink.

8 Claims, 5 Drawing Sheets

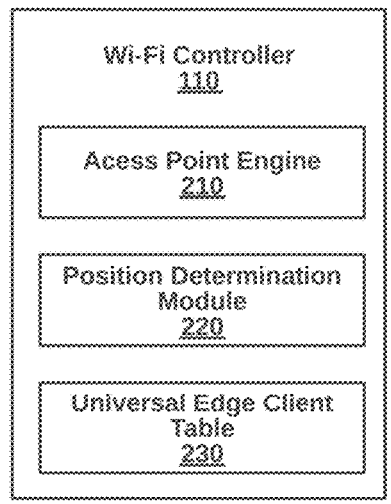
FIG. 2A
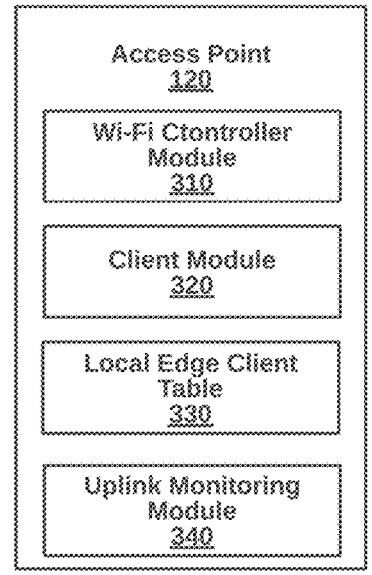
FIG. 2B
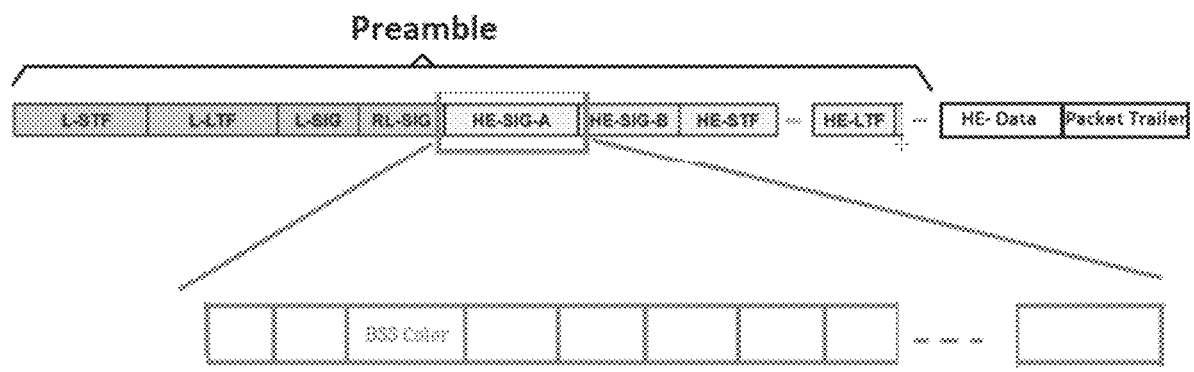
FIG. 3A
FIG. 3B

UTILIZING COLOR SWITCH ANNOUNCEMENT FRAMES TO REDUCE FRAME COLLISIONS AND RETRIES FOR OVERLAPPING UPLINK NETWORK TRAFFIC

FIELD OF THE INVENTION

The invention relates generally to computer networking, and more specifically, to utilize color switch announcement frames for overlapping uplink network traffic in a Wi-Fi-6E portion of a data communication network cost.

BACKGROUND

Before transmitting the data, transmitter triggers the clear channel assessment and find out RSSI of detected energy. if RSSI is above the threshold, medium is considered busy otherwise CSMA/CA process will run. in legacy deployments (pre-11ax), there was only one threshold check (−82 dBm) for energy detection for both inter-BSS and intra-BSS scenarios.

It was an inefficient paradigm in legacy networks that contributed to network congestion and slowdowns since due to very less energy threshold requirement (−82 dBm), channel is declared busy for most of duration and simultaneous use of spectrum was not permitted.

In contrast, WIFI6 is designed to optimize the spatial reuse and makes WIFI6 more efficient by allowing simultaneous operations. It was achieved using feature BSS coloring which was defined for 11ax networks.

Based on BSS color field in HE-SIG-A of preamble, receiver segregates between same BSS (Intra-BSS) and OBSS (Inter-BSS) preambles. This BSS color information allows adaptive clear channel assessment thresholds for inter and intra BSS scenarios. The CCA threshold for Intra-BSS preamble is still same as legacy threshold i.e. −82 dBm however for Inter-BSS scenario, the threshold was increased by 20 dB i.e. to −62 dBm which signals channel availability for energy signals between −62 dBm and −82 dBm as well and thus allow more window for transmission and thus parallel transmission may happen in such scenarios.

The goal of BSS coloring was to spatial re-use by ignoring the transmission from different color BSS for higher CCA thresholds and thus able to transmit simultaneously.

Therefore, what is needed is a robust technique to utilize color switch announcement frames for overlapping uplink network traffic using Wi-Fi-6E.

SUMMARY

These shortcomings are addressed by the present disclosure of methods, computer program products, and systems to utilize color switch announcement frames for overlapping uplink network traffic in a Wi-Fi-6E portion of a data communication network.

In an embodiment, a first BSS color of the access point and clients connected for service to the access point is reported to a Wi-Fi controller over the data communication network by each access point. A local edge client table is then received from the Wi-Fi controller listing each edge client against an overlapping access point, a BSSID for the overlapping access point, and a BSS color for the overlapping access point.

In another embodiment, responsive to receiving uplink traffic from a specific edge client on the edge client table, in-service monitoring for frame retries and collisions associated with the specific edge client is performed. Responsive to detecting that a rate of frame retries and collisions exceed a threshold, a BSS color change announcement frame is transmitted to the specific edge client comprising a second color. The BSS color change announcement directs the specific edge client to adjust the contention CCA threshold to, for example, −82 dBm from earlier −62 dBm, for preambles observed from a specific overlapping BSS associated with the second BSS color. An RSSI related to the overlapping access point exceeds an RSSI related to the access point.

In yet another embodiment, responsive to completion of uplink traffic from the specific edge client, a second BSS color change announcement with the first BSS color is transmitted to the specific edge client. The second BSS color change announcement directs the specific edge client to return to contention based on preambles of the first BSS color.

Advantageously, network performance is improved. In turn, network

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2A is a more detailed block diagram illustrating a Wi-Fi controller in the system of FIG. 1, according to an embodiment.

FIG. 2B is a block diagram illustrating an access point of in the system of FIG. 1, according to an embodiment.

FIG. 3A is a block diagram illustrating a BSS color change announcement element, according to an embodiment.

FIG. 3B is a block diagram illustrating an HE-SIG-A field of an HE-preamble in data frame, according to an embodiment.

DETAILED DESCRIPTION

The description below provides methods, computer program products, and systems to utilize color switch announcement frames for overlapping uplink network traffic in a Wi-Fi-6E portion of a data communication network.

One of ordinary skill in the art will recognize many additional variations made possible by the succinct description of techniques below.

I. Systems for Color Switching Overlapping Uplink Traffic (FIGS. 1-3)

Figure 1:
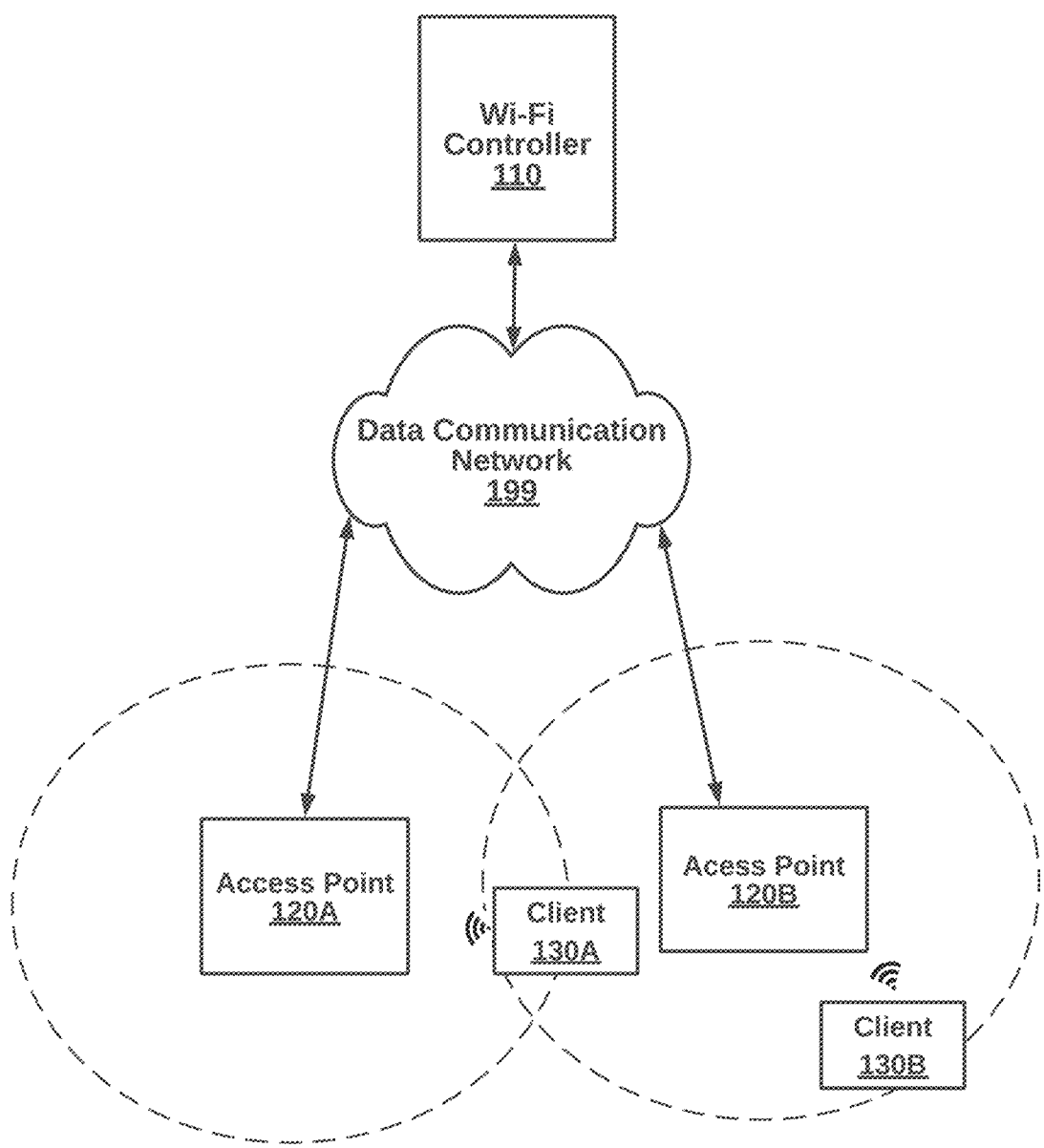
FIG. 1 is a high-level block diagram illustrating a system to utilize color switch announcement frames for overlapping uplink network traffic, according to an embodiment.

FIG. 1 is a high-level illustration of a system 100 to utilize color switch announcement frames for overlapping uplink network traffic, according to an embodiment. The system 100 comprises a Wi-Fi controller 110, access points 120A,B and stations 130A,B. Many variations are possible, including additional (or single) SDWAN controllers, access points, gateways, router, switches, firewalls, stations, and other network components.

The components of the system 100 are coupled in communication over the data communication network 199. Preferably, the access point 110 connected to the data communication system via hard wire, such as local SDWAN controller 110A, remote SDWAN controllers 110B,C and station 120C. Other components, such as the headless IoT devices can be connected indirectly via wireless connection, such as stations 120A,B. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

In general, BSS color change announcement direct a specific edge client to contend for medium access based on preambles observed from a specific overlapping BSS associated with the second BSS color. In one example, the client 130A is positioned within RF range of both the access point 120A and the access point 120B. The client 130A is currently connected to the access point 120A. However, at times, the RF signal from the access point 120B is stronger due to client motion, interference, baseband being used, and for other reasons. As a result, transmission from the client 130A to the access point 120A may experience more interference with transmissions between the client 130B to its current access point 120B. The color change corresponding to the access point 120B, tricks the station 120A to take into account the stronger RF signal, temporarily, to improve the uplink transmissions, as described more fully below.

Additionally, the term 'overlapping' access point having an 'overlapping' BSS (e.g., access point 120B relative to client 130A) is a relative term for the special circumstance of a client experiencing a strong RF signal from an access point that it is not connected to than from the access point that it is connected to. The term 'edge' client (e.g., client 130A) refers to the client in this circumstance. In one case, edge clients are directed to content for mediums at −82 dBm and above.

In one embodiment, the Wi-Fi controller 110 manages configurations for the access points 120A,B. Because the Wi-Fi controller 110 is privy to network-wide conditions, relative positioning between access points and client roaming can be dealt with more effectively. Network architecture and conditions continually change, resulting in top-down reconfigurations for managing uplink traffic. In one case, besides uplink functions, the Wi-Fi controller 110 also provides general management for access points and clients, such as BSS management, steering clients between access points, policy implementation, and the like.

The access points 120A,B each have a distinct, default BSS color for normal use, and update BSS colors as needed when edge clients are having uplink trouble due to overlapping BSS transmissions.

The clients 130A,B can be a PC, smartphone, IoT device or the like, that connects to access points to communicate with other devices on the LAN and across the Internet. RF strength measured by RSSI indicators are a prime factor in deciding which access point to connect. However, a weaker BSS may have better services. For instance, although having a weaker signal, a better protocol or different baseband may provide faster throughput. Further, conditions change, temporarily or permanently, while moving or while static.

FIG. 2A is a more detailed block diagram illustrating a Wi-Fi controller 110 in the system 100 of FIG. 1, according to one preferred embodiment. The Wi-Fi controller 110 comprises an access point module 210, a position determination module 220, and a universal edge-client table 230.

The access point module 210 receives notifications of BSS colors from the access points 120A,B having clients connected for service and access to the network. Other communications and management activities may also be performed, using APIs, network protocols, and manual instructions from network administrators.

The position determination module 220 uses various methods to generate a map of the access points 120A,B and the clients 130A,B. For example, triangulating RSSI values from different access points can yield coordinates for clients. A heat map can provide the same for access points.

Once data is collected, the universal edge-client table 230 can store local edge-client tables for each access point. In one embodiment, a database or table has rows and columns populated with, for each access point, clients, positions of an access point and connected clients, and a BSS color. In another embodiment, updates are periodically entered based on, for example, roaming stations, new connections, powered up or powered down access points.

FIG. 2B is a block diagram illustrating an access point of 110 in the system of FIG. 1, according to an embodiment. The access point 120 comprises a Wi-Fi module 310, a client module 320, a local edge-client table 330, and an uplink monitoring module 340.

The Wi-Fi module 310 reports a BSS color of the access point and clients connected for service to the access point. A local edge-client table can be received and stored in a memory space designated by the local edge-client table 330.

The client module 320 manages connections with clients seeking network services and data exchange over a LAN and over the Internet. A MAC address for connected clients and other aspects are stored and can be passed to the Wi-Fi controller 110 as needed. Specific policies and specific authentication information for each client can also be managed through the client module 320, in some cases.

The uplink monitoring module 340, responsive to receiving uplink traffic from a specific edge client on the edge client table, can perform in-service monitoring for frame retries and collisions associated with the specific edge client. More particularly, responsive to detecting that a rate of frame retries and collisions exceed a threshold, a BSS color change announcement frame (see FIG. 3A) can be transmitted to the specific edge client with a color switch countdown as 0. The color change announcement includes a second BSS color (see FIG. 3B), corresponding to an overlapping access point. Medium contention can be for overlapping BSS frames at or above −82 dBm in one case, and be based on preambles from the overlapping, second BSS. To do so, the HE-SIG-A field of the HE-preamble in a data frame is decoded to expose BSS color, in one implementation. When the uplink traffic is completed, a second BSS color change announcement can be sent with the first. For non-edge clients a default color channel announcement can be used.

II. Methods for Color Switching Overlapping Uplink Traffic (FIG. 4-5)

Figure 4:
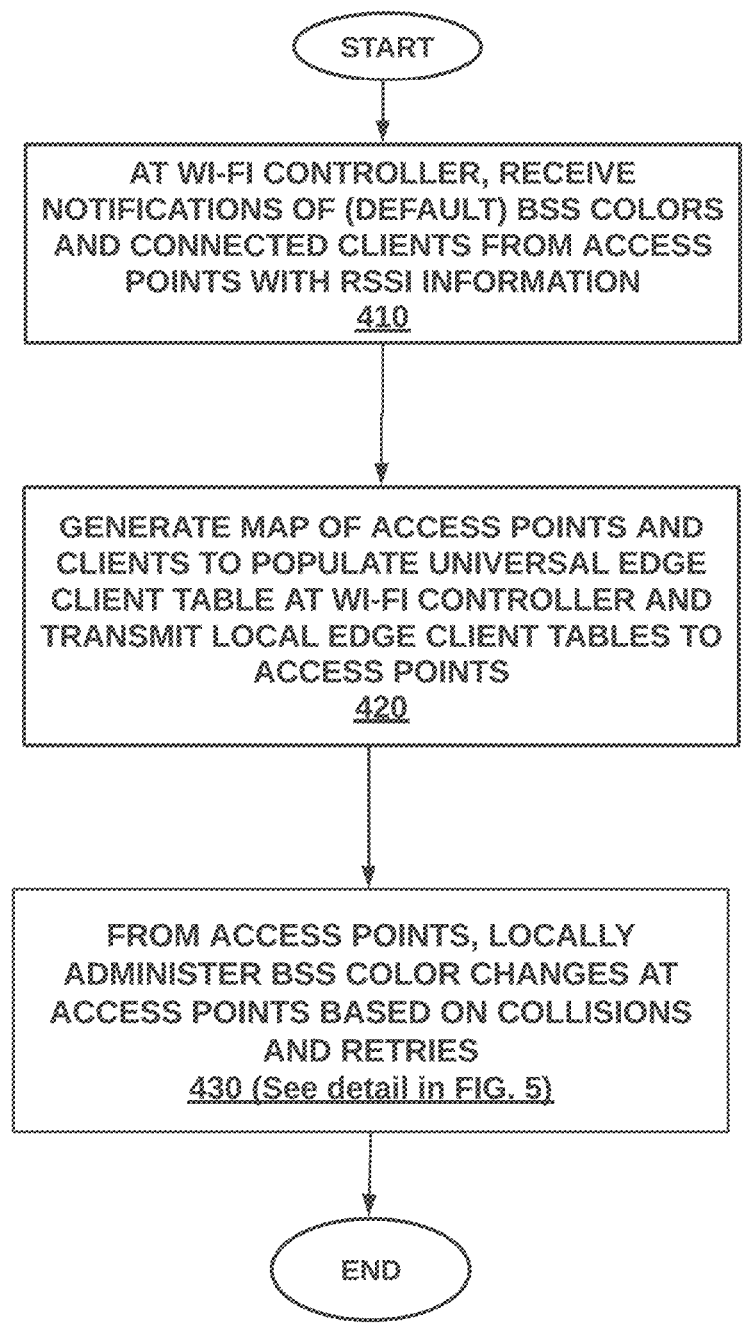
FIG. 4 is a high-level flow diagram illustrating a method in the Wi-Fi controller for managing overlapping uplink network traffic for a group of access points, according to an embodiment.

FIG. 4 is a high-level flow diagram illustrating a method in the Wi-Fi controller for managing overlapping uplink network traffic for a group of access points, according to one embodiment. The method 300 can be implemented, for example, by the system 100 of FIG. 1. The steps are merely representative groupings of functionality, as there can be more or fewer steps, and the steps can be performed in different orders. Many other variations of the method 400 are possible.

At step 410 notifications of BSS colors are received from the access points 120A,B having clients connected for service and access to the network. RSSI information for clients can also be received, for example, different RSSI values for the same client are received from different access points. At step 420, a map of the access points 120A,B and the clients 130A,B is generated, and used to populate a universal edge-client table for access points. At step 430, BSS color changes are locally administered based on collisions and retries, as more fully discussed with respect to FIG. 5.

Figure 5:
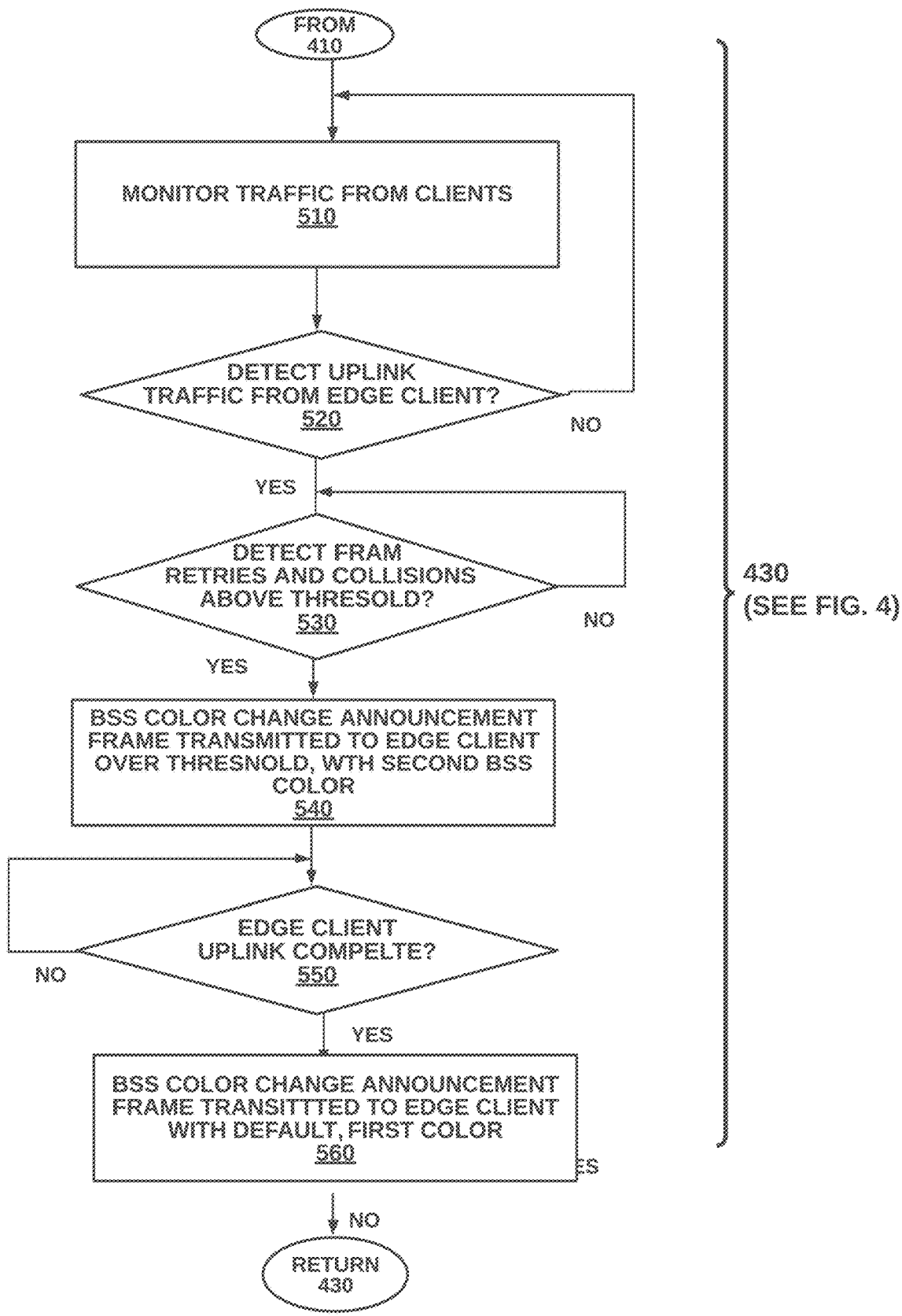
FIG. 5 is a more detailed flow diagram illustrating a step in the access point for monitoring overlapping uplink network traffic for an edge client, for the method of FIG. 4, according to an embodiment.

Turning to FIG. 5 is a more detailed flow diagram illustrating a step in the access point for monitoring overlapping uplink network traffic for an edge client, for the method of FIG. 4, according to an embodiment.

At step 510, traffic from clients of an access point are monitored. Prior to doing so, a BSS color of the access point and clients connected for service to the access point is reported to the Wi-Fi controller, and a local edge client table can be received.

At step 520, responsive to detecting uplink traffic from an edge client, in-service monitoring for frame retries and collisions associated with the specific edge client is monitored, at step 530. A threshold is manually or automatically set and can be a raw amount, or rate, or other trigger. Responsive to detecting that a rate of frame retries and collisions exceed a threshold, at step 540, a BSS color change announcement frame can be transmitted to the specific edge client. The color change announcement includes a second BSS color, corresponding to an overlapping access point. When the uplink traffic is completed, a second BSS color change announcement can be transmitted with the first, default color, at step 550.

III. Generic Computing Environment (FIG. 6)

Figure 6:
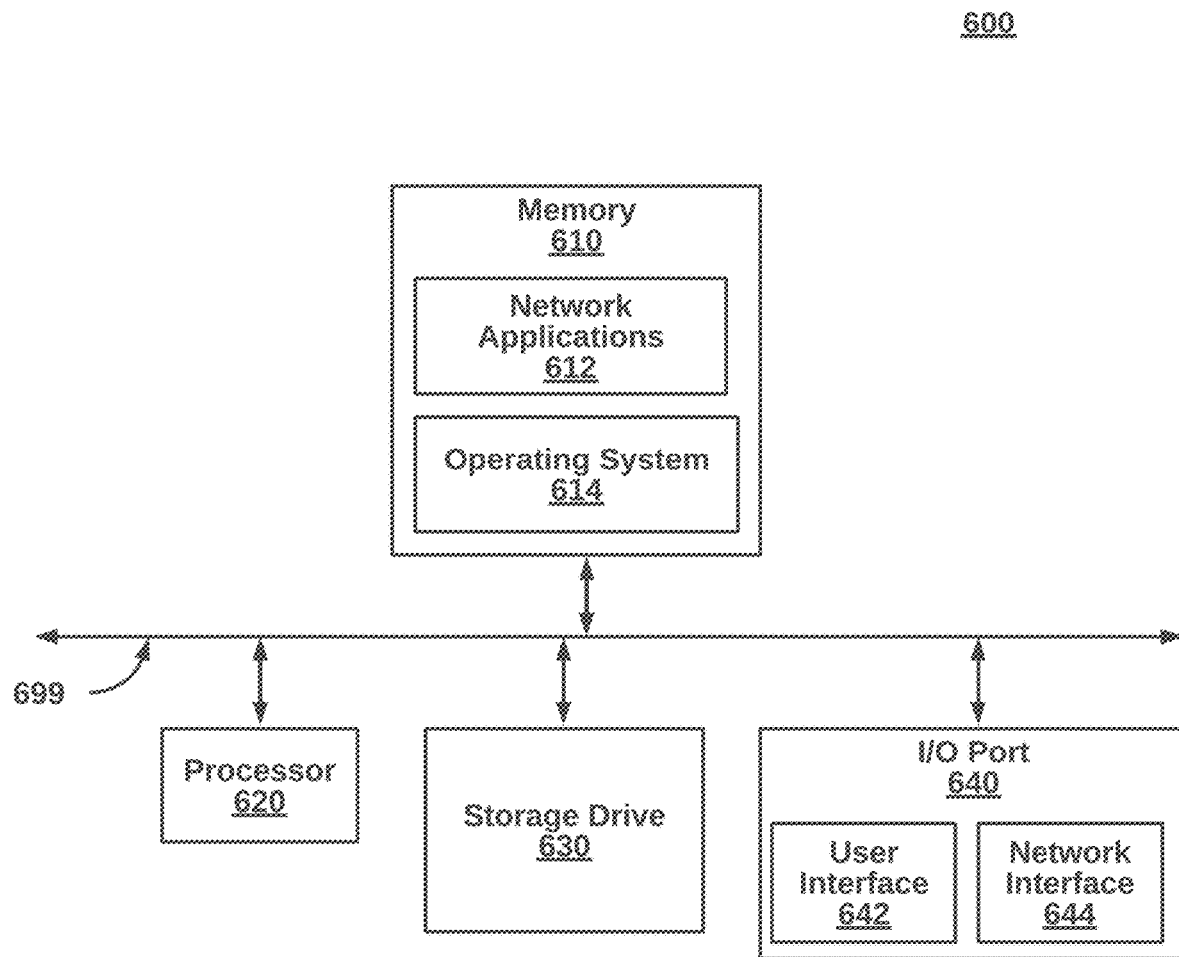
FIG. 6 is a general computing environment for implementing the system of FIG. 1, according to an embodiment.

FIG. 6 is a block diagram of a computing environment 600, according to an embodiment. The computing environment 600 includes a memory 605, a processor 622, a storage drive 630, and an I/O port 640. Each of the components is coupled for electronic communication via a bus 699. Communication can be digital and/or analog and use any suitable protocol. The computing environment 600 can be a networking device (e.g., the local SDWAN controller 110A, the remote SDWAN controllers 110B,C, an access point, a firewall device, a gateway, a router, or a wireless station).

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 622 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 622 can be single core, multiple core, or include more than one processing elements. The processor 622 can be disposed on silicon or any other suitable material. The processor 622 can receive and execute instructions and data stored in the memory 222 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A method in an access point to utilize color switch announcement frames for overlapping uplink network traffic in a Wi-Fi-6E portion of a data communication network, the method comprising the steps of:
    reporting a first BSS color of the access point and clients connected for service to the access point, to a Wi-Fi controller over the data communication network;
    receiving a local edge client table from the Wi-Fi controller listing each edge client against an overlapping access point, a BSSID for the overlapping access point, and a BSS color for the overlapping access point;
    responsive to receiving uplink traffic from a specific edge client on the edge client table, performing in-service monitoring for frame retries and collisions associated with the specific edge client;
    responsive to detecting that a rate of frame retries and collisions exceed a threshold, transmitting a BSS color change announcement frame to the specific edge client comprising a second color, wherein the BSS color change announcement directs the specific edge client to adjust the contention CCA threshold for preambles observed from a specific overlapping BSS associated with the second BSS color, wherein an RSSI related to the overlapping access point exceeds an RSSI related to the access point;
    responsive to completion of uplink traffic from the specific edge client, transmitting a second BSS color change announcement with the first BSS color to the specific edge client, wherein the second BSS color change announcement directs the specific edge client to return to contention based on preambles of the first BSS color.

2. The method of claim 1, wherein the transmitting the BSS color change announcement frame adjusts the contention CCA threshold to −82 dBm from −62 dBm for preambles observed.

3. The method of claim 1, wherein the Wi-Fi controller compiles and provides a universal edge client tables corresponding to a plurality of access points on the Wi-Fi-6E portion.

4. The method of claim 1, wherein the Wi-Fi controller determines a position of the access point and the edge clients.

5. The method of claim 1, wherein the Wi-Fi controller identifies edge clients from positions of a plurality of access points and RSSI reports from frames received from the edge clients.

6. The method of claim 1, wherein the RSSI related to the overlapping access point exceeds 85 dBM and the RSSI related to the access point does not exceed 85 dBM.

7. A non-transitory computer-readable media in an access point (software defined wide area network) controller, implemented at least partially in hardware for, when executed by a processor, performing a method to utilize color switch announcement frames for overlapping uplink network traffic in a Wi-Fi-6E portion of a data communication network, the method comprising the steps of:
    reporting a first BSS color of the access point and clients connected for service to the access point, to a Wi-Fi controller over the data communication network;
    receiving a local edge client table from the Wi-Fi controller listing each edge client against an overlapping access point, a BSSID for the overlapping access point, and a BSS color for the overlapping access point;
    responsive to receiving uplink traffic from a specific edge client on the edge client table, performing in-service monitoring for frame retries and collisions associated with the specific edge client;
    responsive to detecting that a rate of frame retries and collisions exceed a threshold, transmitting a BSS color change announcement frame to the specific edge client comprising a second color, wherein the BSS color change announcement directs the specific edge client to contend for medium access based on preambles observed from a specific overlapping BSS associated with the second BSS color, wherein an RSSI related to the overlapping access point exceeds an RSSI related to the access point;
    responsive to completion of uplink traffic from the specific edge client, transmitting a second BSS color change announcement with the first BSS color to the specific edge client, wherein the second BSS color change announcement directs the specific edge client to return to contention based on preambles of the first BSS color.

8. An access point to utilize color switch announcement frames for overlapping uplink network traffic in a Wi-Fi-6E portion of a data communication network, the access point comprising:
- a processor;
- a network interface communicatively coupled to the data communication network and to the enterprise network; and
- a memory, communicatively coupled to the processor and storing:
  - a Wi-Fi controller module to report a first BSS color of the access point and clients connected for service to the access point, to a Wi-Fi controller over the data communication network;
  - an edge client module to, receive a local edge client table from the Wi-Fi controller listing each edge client against an overlapping access point, a BSSID for the overlapping access point, and a BSS color for the overlapping access point;
  - an uplink monitoring module to, responsive to receiving uplink traffic from a specific edge client on the edge client table, perform in-service monitoring for frame retries and collisions associated with the specific edge client;
  - responsive to detecting that a rate of frame retries and collisions exceed a threshold, transmitting a BSS color change announcement frame to the specific edge client comprising a second color, wherein the BSS color change announcement directs the specific edge client to contend for medium access based on preambles observed from a specific overlapping BSS associated with the second BSS color, wherein an RSSI related to the overlapping access point exceeds an RSSI related to the access point;
  - responsive to completion of uplink traffic from the specific edge client, transmitting a second BSS color change announcement with the first BSS color to the specific edge client, wherein the second BSS color change announcement directs the specific edge client to return to contention based on preambles of the first BSS color.

* * * * *